(12) United States Patent
Bek et al.

(10) Patent No.: US 11,203,074 B2
(45) Date of Patent: Dec. 21, 2021

(54) TOOL ATTACHMENT FOR A POWER TOOL

(71) Applicant: C. & E. Fein GmbH, Schwaebisch Gmuend-Bargau (DE)

(72) Inventors: Fabian Bek, Boebingen (DE); Rainer Mann, Aalen-Dewangen (DE); Tobias Meissner, Weilheim an der Teck (DE); Luisa Riem, Dettingen/Teck (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 0 days.

(21) Appl. No.: 16/563,191

(22) Filed: Sep. 6, 2019

(65) Prior Publication Data

US 2020/0282474 A1 Sep. 10, 2020

(30) Foreign Application Priority Data

Mar. 4, 2019 (DE) ..................... 20 2019 101 214.5

(51) Int. Cl.
*B23B 51/04* (2006.01)
*B23D 61/00* (2006.01)

(52) U.S. Cl.
CPC ...... *B23B 51/0453* (2013.01); *B23B 51/0473* (2013.01); *B23B 51/0426* (2013.01); *B23B 2251/64* (2013.01); *B23D 61/006* (2013.01)

(58) Field of Classification Search
CPC ........................ B23B 51/0453; B23B 51/0473
See application file for complete search history.

(56) References Cited

U.S. PATENT DOCUMENTS

| 51,252 | A | * | 11/1865 | Wyckoff | B23B 51/0473 408/204 |
| 2,312,176 | A | * | 2/1943 | Kotowski | E21B 10/02 408/204 |
| 2,319,528 | A | * | 5/1943 | Barbour | E21B 10/04 408/205 |
| 2,662,428 | A | * | 12/1953 | Mueller | E21B 29/00 408/224 |
| 2,800,812 | A | * | 7/1957 | Mueller | B23B 51/044 408/67 |
| 3,216,153 | A |  | 11/1965 | Saville et al. | |
| 3,265,104 | A | * | 8/1966 | Gallo, Sr. | B23B 51/0453 408/68 |

(Continued)

FOREIGN PATENT DOCUMENTS

| CH | 185076 A | * | 7/1936 | ......... B23B 51/0426 |
| DE | 20 2011 052 062 U1 | | 4/2012 | |

(Continued)

*Primary Examiner* — Eric A. Gates
(74) *Attorney, Agent, or Firm* — Muncy, Geissler, Olds & Lowe, P.C.

(57) ABSTRACT

A tool attachment, in particular hole saw, for a power tool having a driving axle that is drivable in oscillation. The tool attachment including a connecting device with which the tool attachment is attachable to the power tool such that the driving axle thereof and a tool axis essentially coincide. A work area has teeth, with the work area being at least partially circular in design and adjoining a hollow, cylindrical base. Openings are formed in the base, the openings constituting at least 60%, at least 80%, or at least 90% of the area of the base.

12 Claims, 4 Drawing Sheets

(56) References Cited

U.S. PATENT DOCUMENTS

| | | | |
|---|---|---|---|
| 3,390,596 A * | 7/1968 | Trevathan | B23B 51/04 408/68 |
| 3,495,359 A | 2/1970 | Smith et al. | |
| 5,676,501 A * | 10/1997 | Peetz | B23D 61/025 408/204 |
| 5,934,845 A * | 8/1999 | Frey | B23B 51/044 408/68 |
| 6,857,831 B2 | 2/2005 | Davis | |
| 6,890,132 B1 * | 5/2005 | Baron | B23B 51/0473 408/204 |
| 7,658,576 B1 * | 2/2010 | Buzdum | B23B 51/0453 408/204 |
| 8,790,052 B2 * | 7/2014 | Baratta | B28D 1/041 408/204 |
| 9,573,199 B2 * | 2/2017 | Baratta | B27B 5/30 |
| 9,662,720 B2 | 5/2017 | Richter | |
| 10,449,609 B2 * | 10/2019 | Baratta | B23B 51/0473 |
| 10,786,852 B2 * | 9/2020 | Baratta | B28D 1/041 |
| 2012/0125171 A1 * | 5/2012 | Chen | B23B 41/04 83/610 |
| 2017/0157681 A1 * | 6/2017 | Parendo | B23B 51/0406 |
| 2020/0016667 A1 * | 1/2020 | Heath | B23B 51/0453 |
| 2021/0031279 A1 * | 2/2021 | Galiber | B23B 51/0473 |

FOREIGN PATENT DOCUMENTS

| | | | |
|---|---|---|---|
| DE | 10 2013 204 421 A1 | 9/2014 | |
| EP | 0603122 A1 * | 6/1994 | E21B 10/02 |
| EP | 2138255 A2 * | 12/2009 | A61B 17/1637 |
| GB | 2 040 741 A | 9/1980 | |
| GB | 2040741 A * | 9/1980 | B23Q 11/10 |
| GB | 2295109 A * | 5/1996 | B23B 51/0426 |
| JP | 56089414 A * | 7/1981 | B23B 51/0426 |

* cited by examiner

TOOL ATTACHMENT FOR A POWER TOOL

This nonprovisional application claims priority under 35 U.S.C. § 119(a) to German Patent Application No. 20 2019 101 214.5, which was filed in Germany on Mar. 4, 2019, and which is herein incorporated by reference.

BACKGROUND OF THE INVENTION

Field of the Invention

The invention relates to a tool attachment, in particular a hole saw, for a power tool having a driving axle that can be driven in oscillation, with a connecting device with which the tool attachment can be attached to a power tool in such a manner that the driving axle thereof and a tool axis essentially coincide, and with a work area having teeth, the work area being at least partially circular in design and which adjoins a hollow, cylindrical base.

Description of the Background Art

Such tool attachments, also referred to as hole saws, are known from, for example, DE 20 2011 052 062 U1, which corresponds to US 20120125171. They are usually employed in dry construction, and are used when holes must be made in drywall or in oriented strand board, for example in order to place wall outlets or as feedthroughs for pipes. Hole saws are also employed for sawing holes in parquet or other floor coverings. Hole saws in this case are frequently used in combination with power tools that are driven in rotation, such as drills. The use of the tool attachment known from the prior art with power tools that have a driving axle that can be driven in oscillation has proven problematic, however. Due to the high accelerations that arise during the change in direction of oscillating power tools, there is a risk of damage to the power tool on account of the high weight and the resultant high moment of inertia of the tool attachments known from the prior art.

SUMMARY OF THE INVENTION

It is therefore an object of the present invention to reduce the aforementioned disadvantages and provide a tool attachment, in particular a hole saw, that can be used with a power tool that has a driving axle that can be driven in oscillation without adversely affecting its service life.

This object is attained according to the invention with a tool attachment of the abovementioned type by the means that openings are formed in the base, and that the openings constitute at least 60%, preferably at least 80%, and especially preferably at least 90% of the area of the base.

In this way, the weight of the tool attachment can be reduced significantly so that its moment of inertia can also be reduced. As a result, it is then possible to use the tool attachment even on power tools with a driving axle that is driven in oscillation. New possibilities open up for the user as a result of the combination of hole saw and oscillating power tool. Thus, for example, semicircular cuts on the edge of the workpiece can be realized. Also, because of the lack of rotation, dust pollution is significantly lower than when rotating machines, such as drills, are used.

In order to increase the stability of the hollow, cylindrical base in this case, it has proven especially successful when the openings each have a polygonal shape and preferably a hexagonal shape. The hexagonal shape, in particular, has proven successful here because a sort of honeycomb structure can be achieved in this way, and the percentage of openings can be increased still further by this means, which results in an especially light structure that, moreover, is extremely stable. Other polygonal structures are also possible within the scope of the invention in this regard, however.

It has also proven beneficial when the openings are formed as circular areas, which can be are arranged in rows. These circular areas can be manufactured especially easily, which has a beneficial effect on the manufacturing costs.

The circular areas can include at least a multiplicity of first circular areas, each with a first diameter, and a multiplicity of second circular areas, each with a second diameter, and when the first diameter is greater than the second diameter. First of all, the circular areas with different diameters make it possible to increase the percentage of openings further, since the second circular areas with the second, smaller diameters can then additionally be made between the first circular areas with the first, larger diameters. In this context it has proven especially advantageous when the center points of the second circular areas are located at the intersection points of the diagonals between opposing first circular areas. This makes it possible to further increase the percentage of openings, with the result that the weight and the moment of inertia of the tool attachment can be reduced further. In addition, the second, smaller circular areas can serve to accommodate a depth stop, which can be composed of wire clips, for example, that can be inserted into the second, smaller circular areas.

An especially finely graduated depth stop can also be achieved by the means that the rows of the circular areas are not oriented parallel to the working area. Consequently, the position of the depth stop composed of, for example, multiple wire clips can be varied especially finely.

The openings can be designed as, for example, triangles. Chip removal, in particular, is facilitated significantly by this means and by the oscillating motion. The chips produced at the teeth during use of the tool attachment are conducted away from the teeth through the triangles and can exit the tool attachment through the openings. This effect can be enhanced even more when the triangles are designed as axially offset, in particular isosceles, triangles whose vertices are oriented substantially in the direction of the working area.

The moment of inertia can be reduced even further when the base is connected to the connecting device by spokes. In this context it has also proven to be especially beneficial when at least a first angle between a first pair of adjacent spokes is greater than a second angle between a second pair of adjacent spokes. Through the gap thus produced, it is possible to pass a cable with its plug, for example, through the tool. This is only possible, of course, when the tool attachment is used with a power tool with an oscillating drive. When the tool attachment is used with a drill, in contrast, this would result in the cable being severed by the spokes. This gap can be achieved by the means that one of the spokes is omitted, for example. In this case, the angle between these spokes is then ultimately twice as big as the angle between the other spokes. In order to further reduce the moment of inertia here, additional openings can be incorporated into the spokes, by which means it is ultimately also possible to use tool attachments with a larger diameter. These openings in this case can be incorporated using lasers.

In order to increase the stability even more, it has also proven successful when the spokes are formed in a Y-shape. In this design, the angled branches can then be arranged on the outside when viewed in the radial direction.

An accessory can be arranged in the area of the connecting device and/or in the base, which accessory is selected from a group that includes a center point, a valve opener, an ejector, and a depth stop. As a result, it is possible to use the tool attachment according to the invention in an even more versatile manner. Provision is made in this regard within the scope of the invention, in particular, that the accessory is detachably connected to the connecting device, for example by a threaded connection. Especially when a depth stop is used, it has proven successful when the same is inserted into the openings that are formed in the base. The depth stop in this design can be formed of two wire clips that are interlocked. The valve opener can be composed, e.g., of a steel pin, preferably hardened, which is cylindrical in an especially preferred embodiment. This steel pin can be either screwed or pressed into the area of the connecting device.

The hollow, cylindrical base can be made of a flat material, preferably of a strip stock, whose ends are welded, preferably laser welded. This results in especially simple processing of the tool attachment, and it is thus possible to reduce the manufacturing costs. In particular, the teeth can then be incorporated into the flat material in a simple manner before the ends are welded to one another.

The majority of application cases can be covered when the diameter of the hollow, cylindrical base of the tool attachment is between 40 mm and 115 mm.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
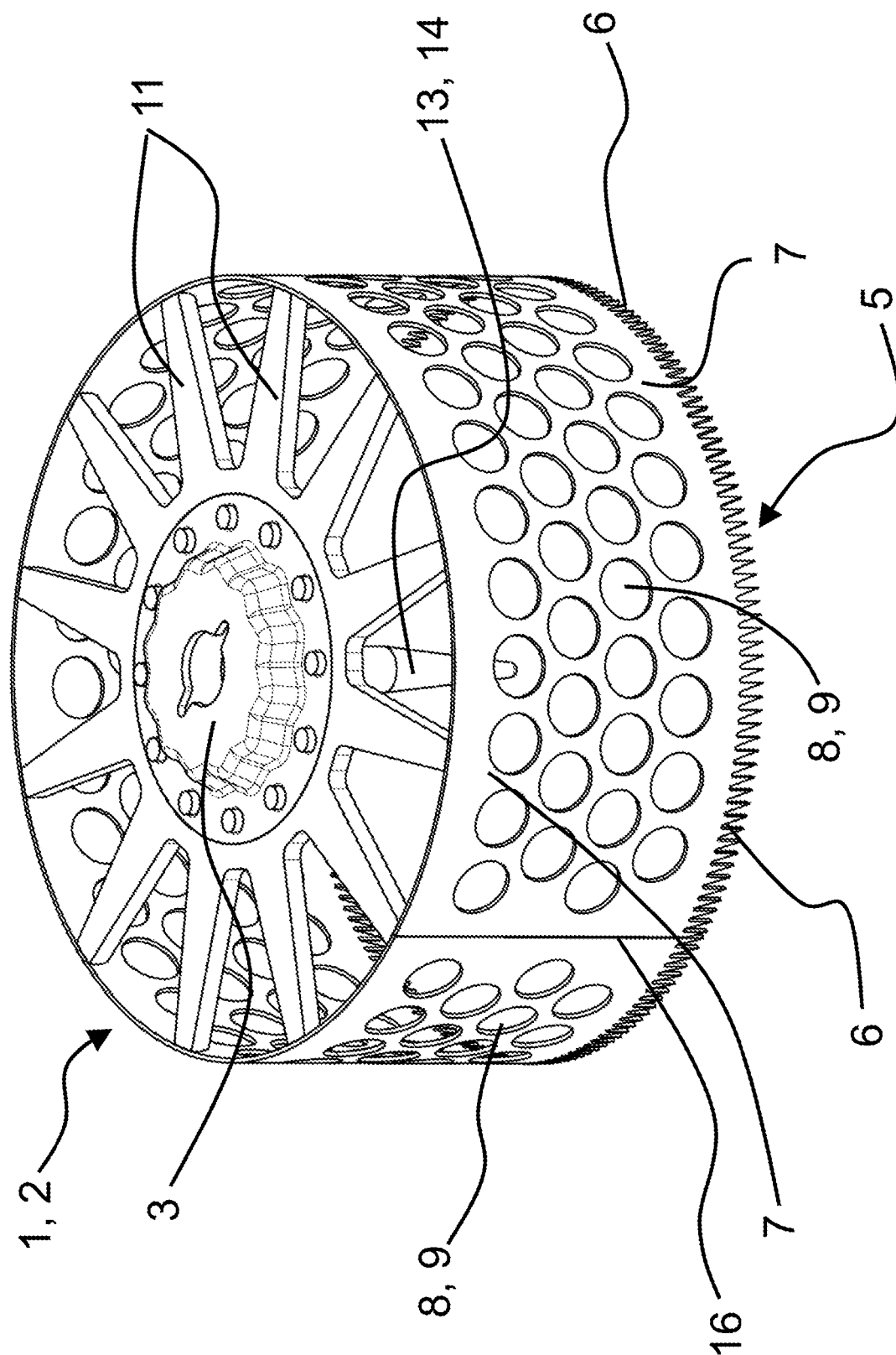
FIG. 1 is a perspective view of a tool attachment.

FIG. 1 shows, in a perspective view, a tool attachment 1 for a power tool that has a driving axle that can be driven in oscillation. The tool attachment 1, which is implemented as a hole saw 2, has a connecting device 3 with which it can be attached to a power tool in such a manner that the driving axle thereof and a tool axis 4 of the tool attachment 1 essentially coincide. In addition, the tool attachment 1 includes a circular working area 5 with teeth 6, which adjoins a hollow, cylindrical base 7. Formed in this base 7 are openings 8, which in the exemplary embodiment shown constitute about 80% of the area of the base 7 and are formed as circular areas 9, which are arranged in rows. The base 7 is connected to the connecting device 3 by spokes 11, by which means the weight and thus the moment of inertia can be further reduced on the one hand, and on the other hand the stability of the hole saw 2 can be ensured. In the area of the connecting device 3, an accessory in the form of a valve opener 13 is screwed in, which makes it possible to use the hole saw 2 to saw open packages that are composed of an outer package and an inner package located therein and in which a valve provided for filling the inner package, which is configured as, e.g., a pouch, is incorporated into the outer package. In order to be able to separate the two packages from one another, the valve must be opened prior to sawing open the outer package in order to be able to equalize the pressure. Such packages are used for liquids such as wine, for example. The valve opener 13 in this case is configured as a mandrel 14, which is made of steel. Alternatively, the accessory can also be configured as a center point, an ejector, or a depth stop 20.

As can also be seen in FIG. 1, the hollow, cylindrical base 7 of the tool attachment 1 is made of a flat material 15 whose ends are welded together. The welded contact area 16 at the end is visible as a line here. The diameter of the hollow, cylindrical base 7 in this case is between 40 mm and 115 mm.

Figure 2:
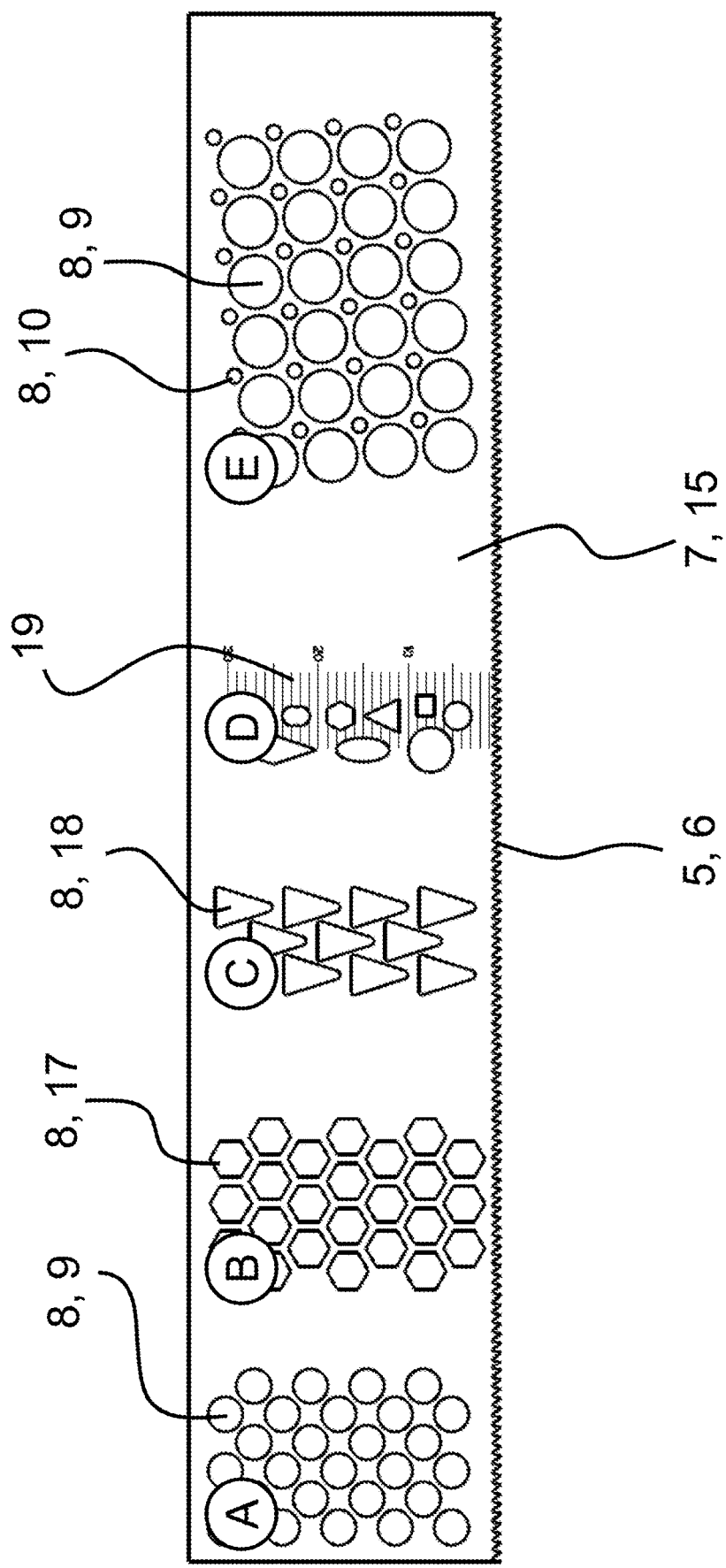
FIG. 2 is a top view of a flat material of a base of the tool attachment with different openings.

In FIG. 2, different shapes of the openings 8 can be seen by way of example. The openings 8 in section A are formed as circular areas 9. In section B, the openings 8 each have a hexagonal shape. This produces a honeycomb structure 17, which is especially stable. In order to improve chip removal, the openings 8 in section C are designed as isosceles triangles 18 that are offset axially and whose vertices are oriented substantially in the direction of the working area 5. In section D, along with the openings 8, which are formed as polygons or as circular areas or elliptical areas, a scale 19 is also printed with which the user of the hole saw 2 can read off the depth of the drilled hole, and thus the progress of the work. Because of the only small oscillation of a few degrees, this scale 19 can also be read during operation. The openings 8 in section E are formed as circular areas 9, 10, which are arranged in rows. The circular areas 9, 10 in this design include a multiplicity of first circular areas 9, each with a first diameter, and a multiplicity of second circular areas 10, each with a second diameter. The first diameter is greater than the second diameter in this design. The circular areas 9, 10 in this design are arranged such that the center points of the second circular areas 10 are located at the intersection points of the diagonals between opposing first circular areas 9. While the first circular areas 9 serve the purposes of weight reduction and chip removal, the second circular areas 10 additionally serve to accommodate a depth stop 20, which can be composed, for example, of two wire clips 21 that are inserted into the second circular areas 10 and are hooked together. Moreover, in the exemplary embodiment shown, the rows of the circular areas 9, 10 are not oriented parallel to the teeth 6 of the working area 5, by which means the position of the depth stop 20 can be adjusted even better.

Figure 3:
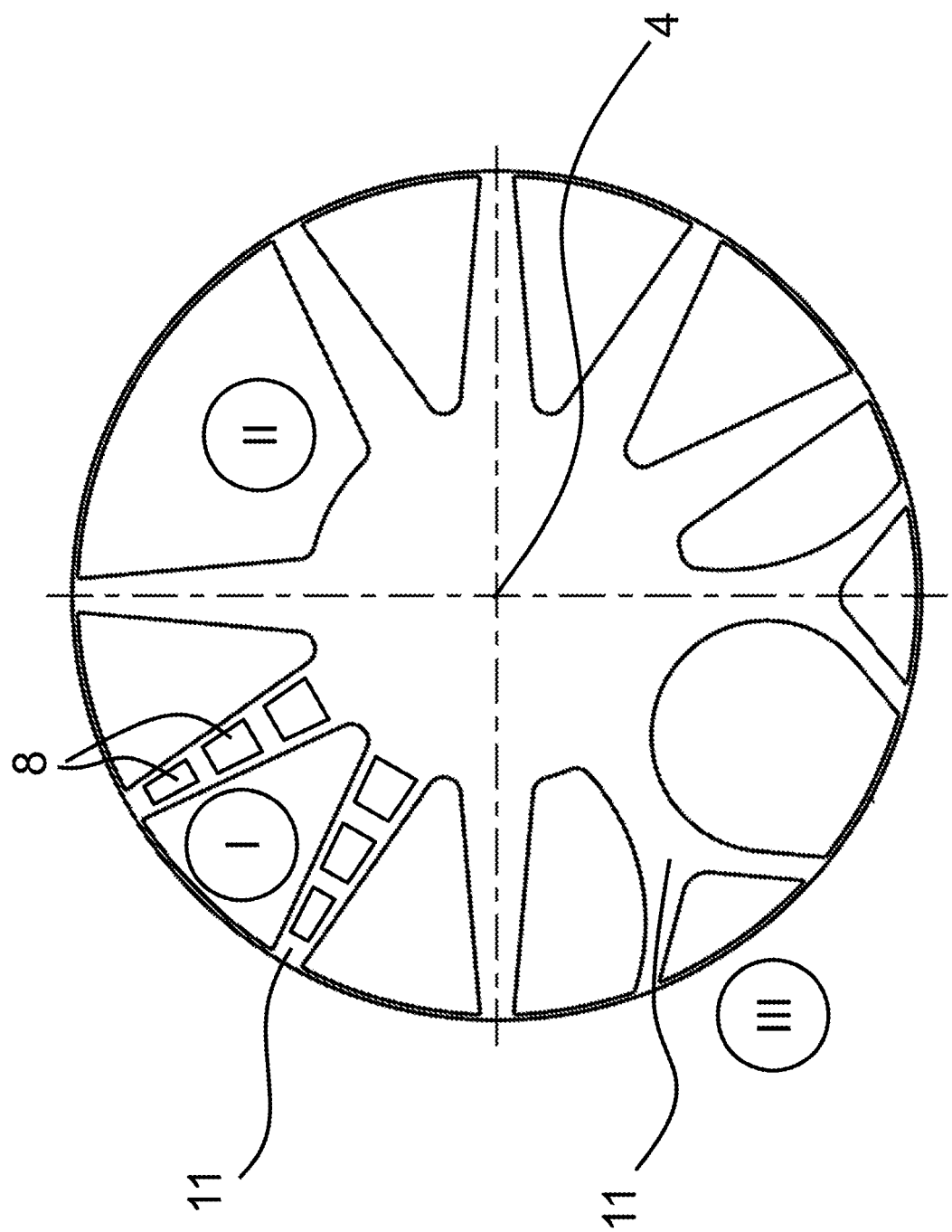
FIG. 3 illustrates various spokes connecting the base to the connecting device.

FIG. 3 shows various connections between the connecting device 3 and the hollow, cylindrical base 7 in a top view. In region I, the connection is accomplished by spokes 11, which taper toward the outside. Openings 8, which in the present case are trapezoidal, can likewise be formed in these spokes 11 in this design. In region II, one of the spokes 11 is omitted, which makes it possible to pass, e.g., a cable through, which is advantageous when placing wall outlets. In region III, the spokes 11 are Y-shaped. It is self-evident that these embodiments shown here are to be understood as examples only and that other spoke shapes are possible. It is also noted that all spokes 11 that serve to join the connecting device 3 with the hollow, cylindrical base 7 are identical in design in each case. In other words, the spokes 11 all are either Y-shaped, as shown in region III, or they are straight and/or additionally have openings 8, as is shown in region I.

Figure 4:
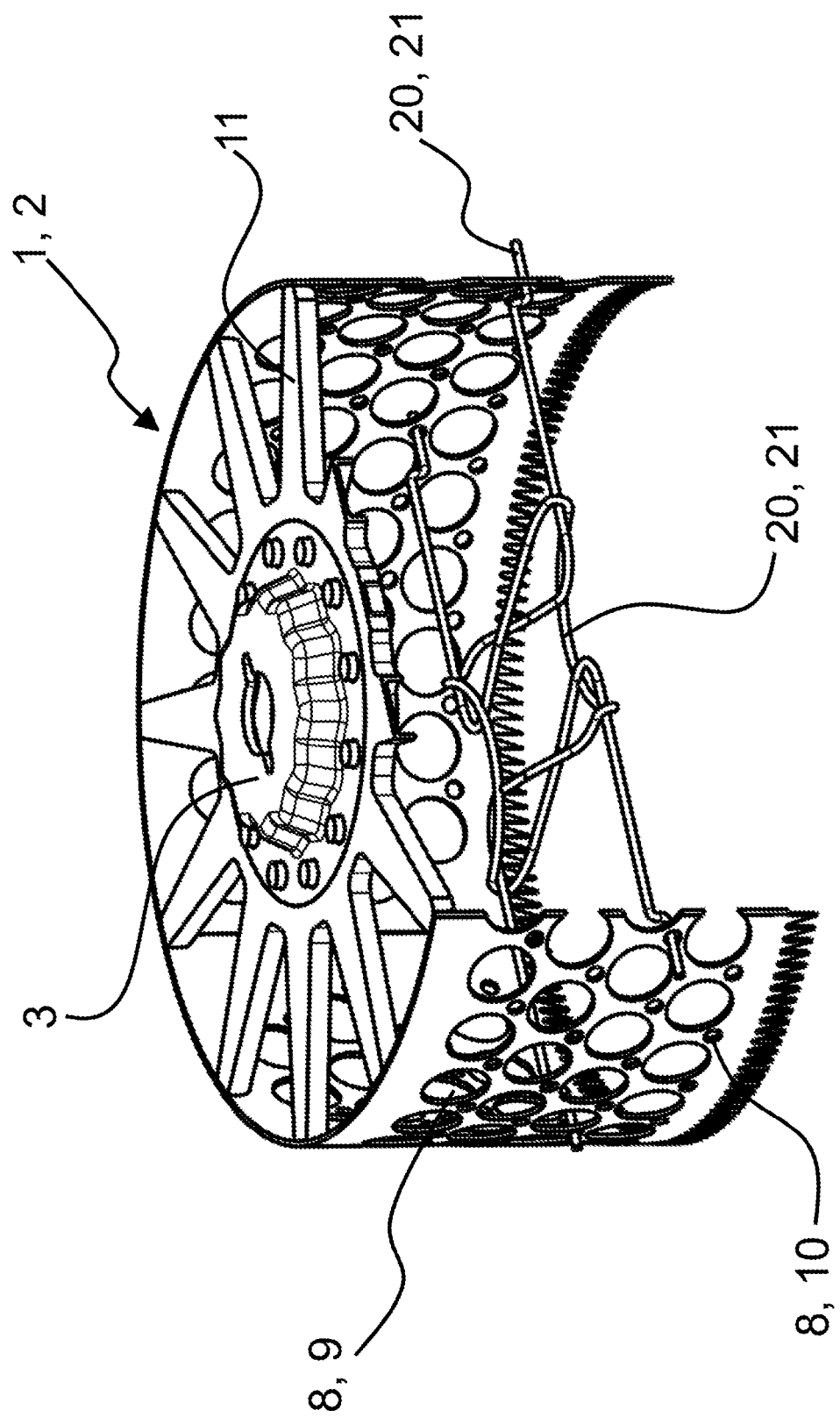
FIG. 4 is a partially sectional view of a tool attachment.

FIG. 4 shows a partially sectional view of the tool attachment 1, in which the openings 8 are composed of the first circular areas 9 and of the second circular areas 10. The depth stop 20, which is composed of two interlocked wire clips 21, is inserted into the second circular areas 10, which have a smaller diameter than the first circular areas 9.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A tool attachment for a power tool having a driving axle that is drivable in oscillation, the tool attachment comprising:
    a connecting device with which the tool attachment is attachable to the power tool such that the driving axle thereof and a tool axis essentially coincide;
    a work area having teeth, the work area being at least partially circular in design and adjoining a hollow, cylindrical base; and
    openings formed in the base, the openings constituting at least 60% of the area of the base,
    wherein the openings are spaced apart from the teeth, such that in a circumferential direction around the base, none of the openings overlap with the teeth, and
    wherein the openings are formed as circular areas and are arranged in rows, each of the rows extending around the base in the circumferential direction.

2. The tool attachment according to claim 1, wherein the circular areas include at least a plurality of first circular areas, each with a first diameter, and a plurality of second circular areas, each with a second diameter, and wherein the first diameter is greater than the second diameter.

3. The tool attachment according to claim 2, wherein center points of the second circular areas are located at intersection points of diagonals between opposing first circular areas.

4. The tool attachment according to claim 1, wherein the rows of the circular areas are not oriented parallel to the working area.

5. The tool attachment according to claim 1, wherein the base is connected to the connecting device via spokes.

6. The tool attachment according to claim 5, wherein at least a first angle between a first pair of adjacent spokes is greater than a second angle between a second pair of adjacent spokes, and wherein all of the spokes are identical to one another.

7. The tool attachment according to claim 5, wherein the spokes are formed in a Y-shape.

8. The tool attachment according to claim 1, wherein an accessory is arranged in an area of the connecting device and/or in the base, and wherein the accessory is a center point, a valve opener, an ejector, or a depth stop.

9. The tool attachment according to claim 1, wherein the base is made of a flat material or of a strip stock, whose ends are welded or laser welded.

10. The tool attachment according to claim 1, wherein a diameter of the base is between 40 mm and 115 mm.

11. The tool attachment according to claim 1, wherein the openings constitute at least 80% of the area of the base.

12. The tool attachment according to claim 1, wherein the openings constitute at least 90% of the area of the base.

* * * * *